United States Patent [19]

Carver et al.

[11] 4,334,381
[45] Jun. 15, 1982

[54] FISHHOOK AND WORM LURE COMBINATION

[75] Inventors: Robert G. Carver, Minden, La.; Clarence Steward, Keller, Tex.

[73] Assignee: Carver Manufacturing Incorporated, Linden, La.

[21] Appl. No.: 197,260

[22] Filed: Oct. 15, 1980

Related U.S. Application Data

[63] Continuation of Ser. No. 17,547, Mar. 5, 1979, abandoned.

[51] Int. Cl.³ .................. A01K 83/06; A01K 85/00
[52] U.S. Cl. ........................... 43/42.29; 43/44.8; 43/44.81
[58] Field of Search .............. 43/43.2, 44.2, 44.4, 43/44.6, 44.8, 44.81, 42.3, 42.24, 42.29, 42.38, 42.39, 42.28

[56] References Cited

U.S. PATENT DOCUMENTS

| | | | |
|---|---|---|---|
| 531,140 | 12/1894 | Stapp | 43/44.8 |
| 551,582 | 12/1895 | Crane | 43/44.8 |
| 2,007,045 | 7/1935 | Francis | 43/42.39 |
| 2,148,074 | 2/1939 | Kaspick | 43/44.8 |
| 2,591,764 | 4/1952 | Allen | 43/44.8 |
| 2,668,387 | 2/1954 | Gallardo | 43/44.4 |
| 2,825,174 | 3/1958 | Leinonen | 43/44.8 |
| 3,212,209 | 10/1965 | Irvin | 43/42.28 |
| 3,344,549 | 10/1967 | Peters et al. | 43/42.24 |
| 3,349,513 | 10/1967 | Jeff | 43/42.02 |
| 3,505,755 | 4/1970 | Pearle | 43/42.06 |
| 3,724,116 | 4/1973 | Lindner | 43/44.8 |
| 3,748,773 | 7/1973 | Goforth | 43/42.1 |
| 3,803,747 | 4/1974 | Cartwright | 43/42.28 |
| 3,831,307 | 8/1974 | Pittman | 43/42.31 |
| 3,834,060 | 10/1967 | Wagenknecht | 43/44.8 |
| 3,978,606 | 9/1976 | Riggs | 43/44.8 |
| 3,983,656 | 10/1976 | Bain | 43/42.24 |
| 3,990,171 | 11/1976 | Davis | 43/42.28 |
| 4,219,956 | 9/1980 | Hedman | 43/42.1 |

FOREIGN PATENT DOCUMENTS

| | | | |
|---|---|---|---|
| 445749 | 5/1927 | Fed. Rep. of Germany | 43/44.2 |
| 474461 | 11/1937 | United Kingdom | 43/44.2 |
| 666742 | 2/1952 | United Kingdom | 43/44.2 |

*Primary Examiner*—Nicholas P. Godici
*Attorney, Agent, or Firm*—Fishburn, Gold and Litman

[57] ABSTRACT

A fishhook and worm lure combination wherein an eye of the fishhook is located adjacent a head portion of a plastic worm lure with the shank extending exteriorly of and adjacent to a body portion of the lure with a barbed point of the hook embedded into the body of the worm lure. The hook is connected to the worm lure by an anchor member pivotally connected to the fishhook as by interconnected eyes with the anchor having a rod portion extending into the worm lure from the head end thereof and having portions within the worm lure and engaging same to resist retraction therefrom. The eye of the hook is connected to a fishing line.

4 Claims, 8 Drawing Figures

4,334,381

FISHHOOK AND WORM LURE COMBINATION

CROSS-REFERENCE TO RELATED APPLICATIONS

The present application is a continuation of United States application for patent, Ser. No. 17,547, filed Mar. 5, 1979, now abandoned.

BACKGROUND OF THE INVENTION

The present invention relates to fishing lures and more particularly to lures having combinations of plastic worms and hooks and the rigging thereof.

Plastic worms, such as are commonly used in bass fishing, consist of elongated bodies formed of flexible, soft plastic material mounted on fishhooks and are in widespread popular usage. One application of the worm to a hook is to insert the hook point coaxially into the nose of the lure and then lead the point out of the side of the lure in the spaced relation to the nose and slide a portion of the lure on the hook around the bight of the hook and along the shank to a point adjacent to hook eye. The point and a major portion of the shank are then exposed exteriorly of the lure and may be snagged in underwater vegetation when the lure is drawn through the water during fishing. In some such uses weed guards are attached to the hook eye and extended exteriorly of the worm to the hook to prevent the hook being snagged by underwater vegetation. Another form of mounting is also by inserting the hook point coaxially into the nose of the lure and then leading the point out the side of the lure and after moving the lure portion empaled on the hook around the bight and shank to a point adjacent to the hook, the point of the hook is then turned and embedded into the lure body. With this arrangement the worm body itself acts as a weed guard however the action of vegetation on the worm or a fish biting the lure may cause the worm body to slide along the hook shank to the bight of the hook where it bunches to the extent that it is difficult to properly set the hook when the fish does bite. This bunching of the lure also necessitates the fisherman rearranging the worm when he retrieves the lure for another cast. There have been various attempts to provide means of securing the worm to the hook but in all such rigging of the worm lure the hook is threaded through the nose or leading portion of the worm.

SUMMARY OF THE INVENTION

The principal objects of the present invention are: to provide a fishhook and worm lure combination in which the hook is free swinging on an anchor or keeper which is inserted in and secured to the leading portion of the worm lure with the hook extending rearwardly exteriorly of the worm and the point of the hook embedded in the worm making the lure weedless; to provide such a fishhook and worm lure combination which eliminates the necessity of threading a hook structure through the worm and in and out of same; to provide such a structure in which it is easier to rig the worm straight with the keeper or anchor having interior engagement with the worm that prevents retractive movement of the worm from the keeper or anchor; to provide such a lure structure adapted for use with jig-head type hooks; to provide such a lure structure adapted for use with buck-tail lure hooks and worm combinations; to provide such a fishhook and worm combination which require less manipulation and penetration of the worms by the hook and thereby longer life of the worms; to provide a fishhook and worm lure combination that enables the fisherman to rig the hook and keeper on any commercially acceptable type plastic worm lure; and to provide a fishhook and worm lure combination which is economical to manufacture, durable in construction, positive in operation and which is particularly well adapted for its intended purpose.

Other objects and advantages of this invention will become apparent from the following description taken in connection with the accompanying drawings wherein are set forth by way of illustration and example certain embodiments of this invention.

The drawings constitute a part of the specification, include exemplary embodiments of the present invention, and illustrate various objects and features of the fishhook and worm lure combination.

Figure 1:
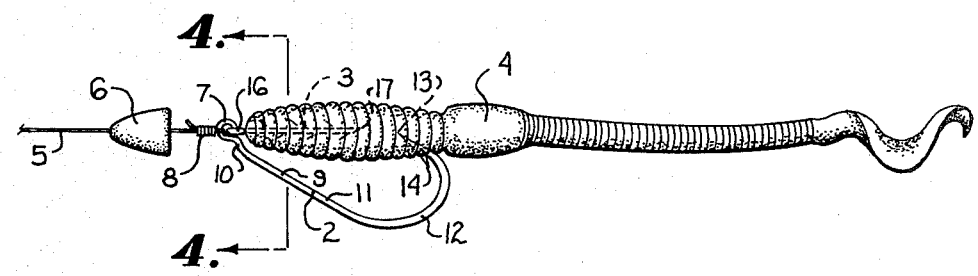
FIG. 1 is a side elevational view of a fishhook and worm lure combination rigged with a line and weight for use therewith.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

DESCRIPTION OF THE PREFERRED EMBODIMENT

The reference numeral 1 generally designates a fishhook and worm lure combination in which a fishhook 2 is secured by an anchor or keeper 3 to a worm lure 4 in the form of a flexible, soft plastic, elongate worm lure. A fishing line 5 has a weight 6 sleeved thereon and said line is tied to the eye 7 of the fishhook 2 by a suitable knot or the like 8.

In the structure illustrated in the FIGS. 1 to 5 inclusive the fishhook 2 is of common design consisting of a length of wire bent at one end to form an eye 7 into which a fishing line or leader 5 is secured, then a shank section 9 which may be angled to produce a short section 10 adjacent the eye and a longer section 11 and then a re-entrant curved bight portion 12 terminating in a point 13 and barb 14. In the structure illustrated, the eye, shank, bight and point are all in a single plane. The plastic worm 4 may be of any commercially acceptable form consisting of a slender elongated body of extremely soft, flexible and elastic plastic material configurated to resemble a prey of fish and to provide an action to attract same. The plastic worm 4 is much longer than the fishhook 2.

The anchoring member or keeper 3 for securing the worm 4 to the fishhook consists of elongate rigid rod-like member 15 of wire, plastic or the like bent at one end to form an eye 16 and having a point 17 at the other end. The anchor has a plurality of laterally outwardly extending projections or barbs 18 spaced along the length thereof. It is preferred that the rod portion 15 be longitudinally straight and that it have a length of ½ to ¾ of the distance from the eye 7 to the barb point 13 of the fishhook 2. The fishhook is swingably or pivotally connected to the anchor member and in the illustrated structure the eye 16 of the anchor or keeper 3 is interconnected with the eye 7 of the hook.

Figure 2:
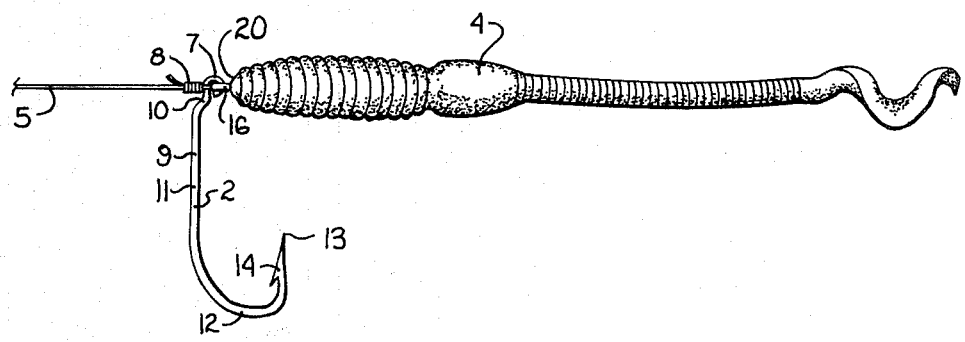
FIG. 2 is a side elevational view of the fishhook and worm combination prior to embedding the hook point into the worm body.
Figure 3:
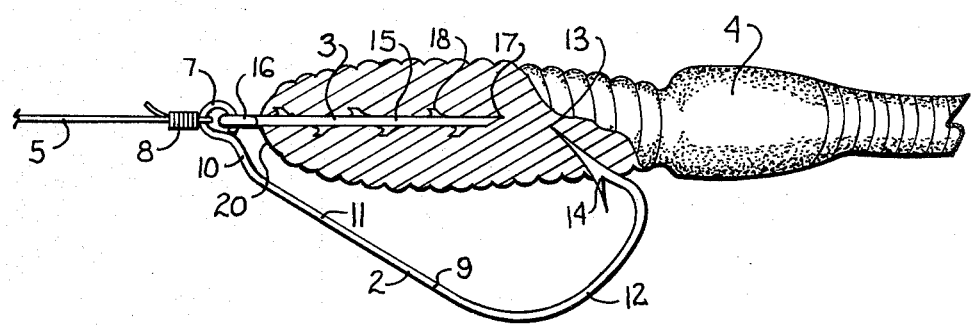
FIG. 3 is a longitudinal sectional view through the leading portion of a fishhook and worm lure combination in assembled condition.
Figure 4:
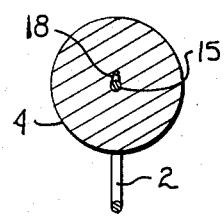
FIG. 4 is a transverse sectional view through the fishhook and worm lure combination taken on the line 4—4, FIG. 3.
Figure 5:
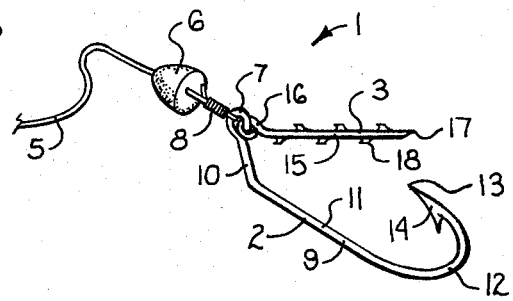
FIG. 5 is a perspective view of the fishhook and anchor member.

In attaching a fishhook and keeper structure to a worm lure the fishhook is allowed to swing free as illustrated in FIG. 2 and the point 17 of the anchor or keeper rod 15 is pressed coaxially into the nose end 20 of the worm to extend longitudinally therein for the full length of the rod whereby the eye 16 thereof is adjacent the nose end 20 of the plastic worm lure. The line 5 has a weight 6 slidably mounted thereon and the end of the line is suitably tied or secured as at 8 to the eye 7 of the fishhook 2. The fishhook 2 being entirely external of the worm lure is then swung to a position wherein the shank portion 11 extends at an acute angle to the longitudinal axis of the worm, the point 13 is embedded into the body of the worm lure as illustrated in FIG. 1 and the fishhook worm lure combination is ready for fishing.

When fishing it will be seen that the leading portion of the worm acts as a weed guard preventing underwater vegetation from entering the bight of the hook. Also the shank of the hook is such that it can easily slide over obstructions and even engagement of the worm with obstructions wil not cause it to slide from the hook or keeper. When the fish bites it usually substantially engulfs the hook in its mouth and exerts a pulling force opposite to the pull of the fishing line or leader 5 tending to force the point 13 on through the worm body to expose it for setting in the fish's mouth with no bunching or wadding of the worm into the bight to interfere with the setting of the hook.

Figure 6:
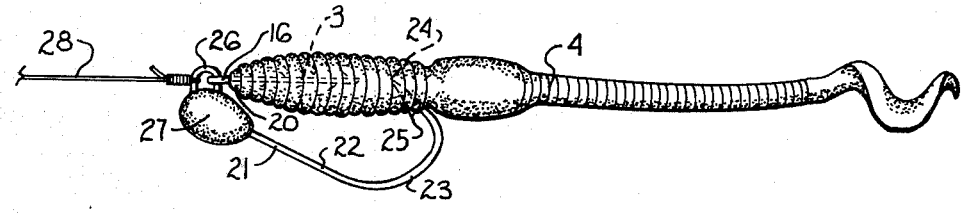
FIG. 6 is a side elevational view of a modified form of the invention utilizing a jig-head hook and worm lure.

In the form of the invention illustrated in FIG. 6 the hook member 21 is of a type called a jig-head hook having a shank 22, a re-entrant bight portion 23 terminating at a point 24 and barb 25. The other end has an eye 26 with a head or weight 27 adjacent thereto. The head 27 may be of lead or other suitable material to provide a desired weight and the eye 26 is arranged relative thereto to normally be above said head 27. The keeper or anchor member 3 is of the same construction as illustrated and described relative to the forms shown in FIGS. 1 to 5 inclusive with the eye 16 thereof interconnected with the eye 26 of the jig-head hook 21. Since the weight member 27 provides the desired weight for the lure there is no need for a weight on the line. The line 28 has its end suitably tied or otherwise secured to the eye 26. In using such a lure the keeper is inserted longitudinally into the plastic worm 4 from the nose 20 to position the eye 16 at said nose 20 of the lure. The hook 21 is then swung to extend along the body of the plastic worm and the barbed point 24 embedded into the worm as illustrated in FIG. 6. The lure is then ready for fishing, with the lure having the same weedless effect as above described.

Figure 7:
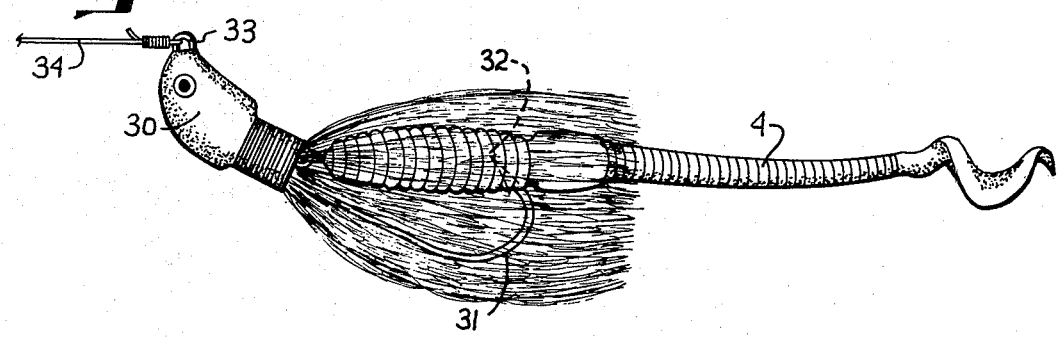
FIG. 7 is a side elevational view of a buck-tail lure and a worm lure combination.
Figure 8:
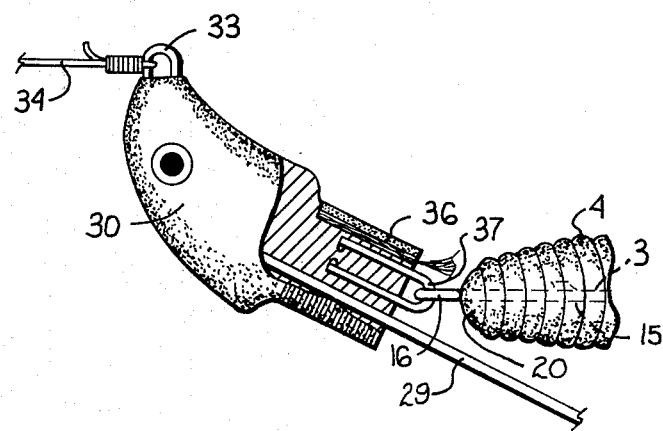
FIG. 8 is a partial sectional view through the buck-tail lure of FIG. 7 showing the connection of the buck-tail head and anchor member.

The form of the lure illustrated in FIGS. 7 and 8 utilizes a form of buck-tail lure hook having a shank 29 extending from a head 30 and provided with a re-entrant bight 31 terminating at a barbed point 32. The shank 29 extends through the head 30 and terminates in an eye 33 to which a fishing line 34 is tied or secured in the usual manner. The lure is provided with a plurality of fibers of hair or the like suitably tied or secured as at 36 to the head 30 whereby the hair or buck-tail extends therefrom toward the hook point 32 in surrounding relation to the shank 29. The keeper or anchor member 3 is pivoted or swingably mounted to the head 30 at the end 36 thereof adjacent the shank 29. In the structure illustrated there is an eye member 37 secured to the head 30 with the eye 37 preferably in the same plane as the shank 29 and hook 32 and said eye 37 is interconnected with the eye 16 of the anchor member 3. In using a lure constructed as described the line 34 is suitably tied or otherwise connected to the eye 33. The anchor or keeper member 3 is then arranged relative to a plastic worm 4 and the point 17 of the anchor rod 15 inserted axially into the nose 20 of the lure and forced therein for the length of the keeper rod 15 whereby the nose 20 of the plastic worm lure is adjacent to the interconnected eyes 16 and 37 and with the hook of the buck-tail lure swingable relatively thereto. The buck-tail hook is then moved to embed the barbed point 32 into the body of the worm lure as illustrated in FIG. 7. The lure is then ready for fishing.

While certain forms of the present invention have been described and illustrated, it is not to be limited thereto except insofar as such limitations are included in the following claims.

What is claimed and desired to secure by Letters Patent is:

1. In combination with a plastic worm lure, an improved fishhook and connector device for rigging and retaining said plastic worm lure thereon comprising:
   (a) a fishhook comprising a length of wire formed to present successively an eye, an elongated shank, a re-entrant curved bight and a barbed point, said shank further having a bend adjacent the eye thereof whereby the eye is offset from the shank in the same direction as the barbed point, said eye, shank, curved bight and barbed point being substantially in a single plane; said eye being adjacent a head of the worm and the elongated shank at an acute angle relative to the longitudinal axis of the worm with the barbed point embedded in said worm to assume a bite responsive position under an exterior surface of the worm, said fishhook eye being the line attaching eye;
   (b) an elongate straight and substantially rigid anchor member having a shank with eye at one end and a pointed end at the other end, said anchor member pointed end generally pointed toward said fishhook barbed point; said anchor rod being of a length approximately one-half to three-fourths of a distance between said fishhook eye and barbed point, said anchor member shank extending into the worm lure from the head end with the anchor rod eye positioned exteriorly of and adjacent said head end; said anchor member shank having a plurality of laterally outwardly extending projections spaced apart along the length thereof to resist retraction from the worm lure; and (c) said fishhook being swingably connected to the anchor member by swingably joining the fishhook eye to the anchor member eye.

2. A fishhook and bait connector as set forth in claim 1 wherein:

(a) said fishhook is a jig head having a weight member on the shank and the fishhook eye is adjacent said shank, said fishhook eye, re-entrant curved bight and barbed point are in a single plane.

3. A fishhook and bait connector as set forth in claim 2 wherein:

(a) said weight member has a first end and a second end and the fishhook shank extends from the second end;

(b) the fishhook eye extends from a side of the weight member adjacent said first end and is the line attaching eye;

(c) the eye of the fishhook interconnected with the eye of the anchor rod is at said first end of the weight member spaced from and adjacent an intermediate portion of said shank.

4. In combination with a plastic worm lure, a fishline leader and a slip sinker shiftably mounted on a complemental end portion of said leader, an improved fishhook and connector device for rigging and retaining said plastic worm lure thereon comprising:

(a) a fishhook comprising a length of wire formed to present successively an eye, an elongated shank, a re-entrant curved bight and a barbed point, said shank further having a bend adjacent the eye thereof whereby the eye is offset from the shank in the same direction as the barbed point, said eye, shank, curved bight and barbed point being substantially in a single plane; said eye being adjacent a head of the worm and the elongated shank at an acute angle relative to the longitudinal axis of the worm with the barbed point embedded in said worm to assume a bite responsive position under an exterior surface of the worm, said fishhook eye being the line attaching eye;

(b) an elongate straight and substantially rigid anchor member having a shank with eye at one end and a pointed end at the other end, said anchor member pointed end generally pointing toward said fishhook barbed point; said anchor rod being of a length approximately one-half to three-fourths of a distance between said fishhook eye and barbed point, said anchor member shank extending into the worm lure from the head end with the anchor rod eye positioned exteriorly of and adjacent said head end; said anchor member shank having a plurality of laterally outwardly extending projections spaced apart along the length thereof to resist retraction from the worm lure; and (c) said fishhook being swingably connected to the anchor member by swingably joining the fishhook eye to the anchor member eye.

* * * * *